(12) United States Patent
Heng et al.

(10) Patent No.: US 10,543,663 B2
(45) Date of Patent: Jan. 28, 2020

(54) RIGIDIZED HYBRID INSULATING NON-OXIDE THERMAL PROTECTION SYSTEM AND METHOD OF PRODUCING A NON-OXIDE CERAMIC COMPOSITE FOR MAKING THE SAME

(71) Applicant: The Boeing Company, Chicago, IL (US)

(72) Inventors: Vann Heng, Buena Park, CA (US); Winnie W. Chen, Huntington Beach, CA (US); Leanne L. Lehman, Aliso Viejo, CA (US); Patrick J. Mobers, Long Beach, CA (US); Merna E. Salama, Cerritos, CA (US); Thomas R. Pinney, Long Beach, CA (US); Jonathan D. Embler, Tustin, CA (US); Dan E. Driemeyer, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 11 days.

(21) Appl. No.: 15/427,581

(22) Filed: Feb. 8, 2017

(65) Prior Publication Data
US 2018/0222157 A1    Aug. 9, 2018

(51) Int. Cl.
*B32B 7/02* (2019.01)
*B32B 18/00* (2006.01)
(Continued)

(52) U.S. Cl.
CPC ............... *B32B 18/00* (2013.01); *B32B 5/26* (2013.01); *B32B 7/02* (2013.01); *B32B 7/12* (2013.01); *B32B 27/283* (2013.01); *B32B 37/12* (2013.01); *B32B 37/144* (2013.01); *B32B 37/18* (2013.01); *B64G 1/58* (2013.01); *C04B 37/001* (2013.01);
(Continued)

(58) Field of Classification Search
CPC . B32B 18/00; B32B 2250/03; B32B 2255/26; B32B 2262/106; B32B 2307/304; B32B 2307/722; B32B 2307/734; B32B 2315/02; B32B 2383/00; B32B 2605/00; B32B 27/283; B32B 37/12; B32B 37/144;
(Continued)

(56) References Cited

U.S. PATENT DOCUMENTS 5,310,592 A    5/1994   Baker et al.
5,626,951 A    5/1997   Hogenson
(Continued)

FOREIGN PATENT DOCUMENTS

WO    WO 2014/149759    9/2014

OTHER PUBLICATIONS

European Patent Office, "Extended European Search Report," App. No. 17202589.2 (dated May 24, 2018).

*Primary Examiner* — Lawrence D Ferguson
(74) *Attorney, Agent, or Firm* — Walters & Wasylyna LLC

(57) ABSTRACT

A thermal protection system is provided for a vehicle substructure. The thermal protection system comprises an outer layer for protecting the vehicle substructure. The thermal protection system further comprises an inner layer for conforming to the vehicle substructure. The thermal protection system also comprises an insulation layer sandwiched between the inner and outer layers. The insulation layer includes a porous low-density ceramic insulating material having a densified portion that covers an inner surface of the outer layer to strengthen adhesion.

20 Claims, 3 Drawing Sheets

(51) Int. Cl.
  *B32B 7/12* (2006.01)
  *B32B 27/28* (2006.01)
  *B32B 37/18* (2006.01)
  *B32B 37/14* (2006.01)
  *B32B 37/12* (2006.01)
  *C04B 37/00* (2006.01)
  *C04B 37/02* (2006.01)
  *B64G 1/58* (2006.01)
  *B32B 5/26* (2006.01)

(52) U.S. Cl.
  CPC ........ *C04B 37/028* (2013.01); *B32B 2250/03* (2013.01); *B32B 2255/26* (2013.01); *B32B 2262/106* (2013.01); *B32B 2307/304* (2013.01); *B32B 2307/722* (2013.01); *B32B 2307/734* (2013.01); *B32B 2315/02* (2013.01); *B32B 2383/00* (2013.01); *B32B 2605/00* (2013.01); *C04B 2237/02* (2013.01); *C04B 2237/32* (2013.01); *C04B 2237/36* (2013.01); *C04B 2237/363* (2013.01); *C04B 2237/365* (2013.01); *C04B 2237/368* (2013.01); *C04B 2237/38* (2013.01); *C04B 2237/704* (2013.01)

(58) Field of Classification Search
  CPC .. B32B 37/18; B32B 5/26; B32B 7/02; B32B 7/12
  See application file for complete search history.

(56) References Cited

U.S. PATENT DOCUMENTS

| | | |
|---|---|---|
| 8,864,073 B1 | 10/2014 | Kim et al. |
| 2003/0205310 A1* | 11/2003 | DiChiara, Jr. .......... B32B 19/04 156/60 |
| 2004/0091736 A1 | 5/2004 | Dichiara |
| 2007/0155849 A1* | 7/2007 | Miller .................... C04B 35/83 521/181 |
| 2008/0176020 A1 | 7/2008 | Heng et al. |

* cited by examiner

RIGIDIZED HYBRID INSULATING NON-OXIDE THERMAL PROTECTION SYSTEM AND METHOD OF PRODUCING A NON-OXIDE CERAMIC COMPOSITE FOR MAKING THE SAME

FIELD

The present application relates to thermal protection systems for vehicles, and is particularly directed to a rigidized hybrid insulating non-oxide (RHINO) thermal protection system and a method of producing a non-oxide ceramic composite for making the same for a high-speed vehicle, such as a high-speed strike weapon.

BACKGROUND

A typical thermal protection system for a high-speed vehicle includes a number of material layers. The material layers can include an insulation layer sandwiched between an outer layer and an inner layer that conforms to a surface of a substructure of the high-speed vehicle. As an example of a known thermal protection system, the insulation layer comprises a relatively rigid material, such as a relatively low density fibrous ceramic material. The outer layer comprises a substantially rigid and relatively thin member having relatively high temperature resistance and relatively high structural durability, such as a ceramic matrix composite material. The inner layer comprises a resiliently compressible material that has relatively low shear stiffness or relatively low tension stiffness. The inner layer is compressively preloaded against the vehicle substructure when the outer layer is on the vehicle substructure. It would be desirable to provide improved thermal protection systems for high-speed vehicles, such as high-speed strike weapons.

SUMMARY

In one aspect, a thermal protection system is provided for a vehicle substructure. The thermal protection system comprises an outer layer for protecting the vehicle substructure. The thermal protection system further comprises an inner layer for conforming to the vehicle substructure. The thermal protection system also comprises an insulation layer sandwiched between the inner and outer layers. The insulation layer includes a porous low-density ceramic insulating material having a densified portion that covers an inner surface of the outer layer to strengthen adhesion.

In another aspect, a thermal protection system is provided for a vehicle substructure. The thermal protection system comprises an outer rigid layer including a thin-skin layer of non-oxide ceramic composite, such as carbon-fiber reinforced silicon carbide, for protecting the vehicle substructure. The thermal protection system further comprises an inner conformal layer conforming to the vehicle substructure. The thermal protection system also comprises a rigid ceramic insulation layer sandwiched between the inner and outer layers. The insulation layer includes a porous low-density ceramic material having a density between about 12 lbs/ft$^3$ and 25 lbs/ft$^3$.

In yet another aspect, a method of producing a non-oxide ceramic composite is provided for making a rigidized hybrid insulating non-oxide thermal protection system for a vehicle substructure. The method comprises forming a layer of porous low-density ceramic insulating material having a density between about 12 lbs/ft$^3$ and 25 lbs/ft$^3$ to a desired size and shape. The method further comprises densifying a layer portion of the layer of porous low-density ceramic insulating material to create a densified layer portion having a density between about 24 lbs/ft$^3$ and 50 lbs/ft$^3$. The method also comprises co-processing the multi-layer densified layer portion to a thin-skin layer of non-oxide ceramic composite, such as carbon-fiber reinforced silicon carbide. The method further comprises covering an inner surface of the layer of porous low-density ceramic insulating material with a layer of conforming material.

Other aspects will become apparent from the following detailed description, the accompanying drawings and the appended claims.

DETAILED DESCRIPTION

The present disclosure is directed to a rigidized hybrid insulating non-oxide (RHINO) thermal protection system and a method of producing a non-oxide ceramic composite for making the same. The specific construction of the thermal protection system and the industry in which the thermal protection system is implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes a RHINO thermal protection system for protecting a high-speed vehicle, such as a high-speed strike weapon. The RHINO thermal protection system may be implemented by an original equipment manufacturer (OEM) for manufacturing thermal protection systems in compliance with military and space regulations.

Figure 1:
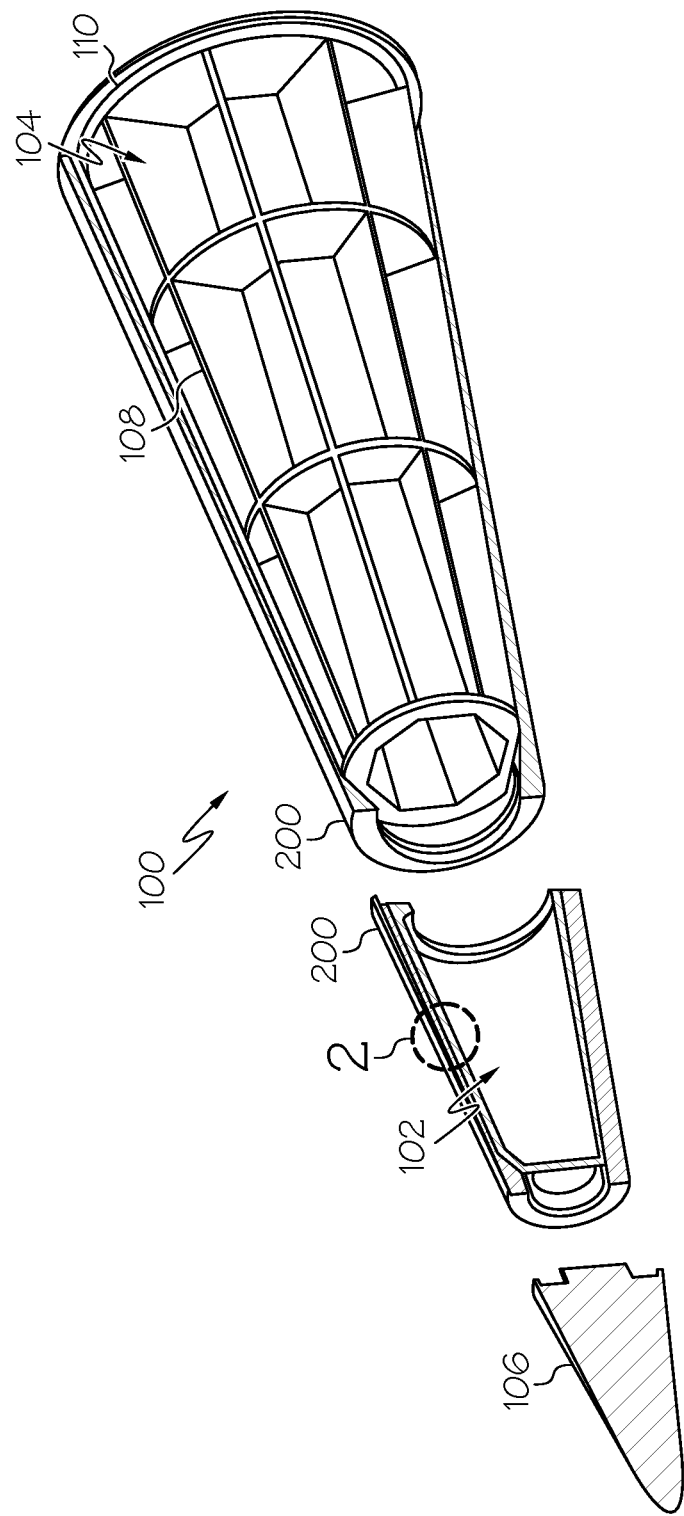
FIG. 1 is an exploded perspective view, showing some parts in only section, of a substructure of a high-speed vehicle encompassed by a rigidized hybrid insulating non-oxide (RHINO) thermal protection system constructed in accordance with an example embodiment.

Referring to FIG. 1, an exploded perspective view of an example high-speed vehicle 100 encompassed by a RHINO thermal protection system constructed in accordance with an example embodiment is illustrated. The exploded perspective view of FIG. 1 shows some parts in only section. High-speed vehicle 100 includes front cone portion 102 that is disposed between rear cone portion 104 and nose tip 106.

Nose tip 106 may comprise tungsten material. Rear cone portion 104 has a rib substructure 108 that may comprise titanium material. Titanium rib substructure 108 is disposed in front of bulkhead 110 that may also comprise titanium material. Rear cone portion 104 has a length of about 36 inches (91.44 centimeters), and front cone portion 102 has a length of about 16 inches (40.64 centimeters). Thermal protection system 200 is disposed on front cone portion 102 and rear cone portion 104.

Figure 2:
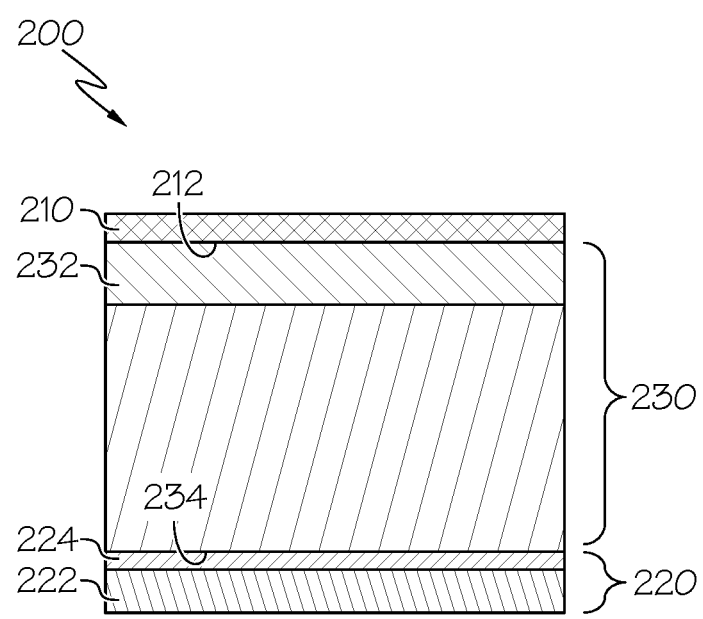
FIG. 2 is an enlarged view of a portion of FIG. 1, and showing a cross-section of material layers of the RHINO thermal protection system.

Referring to FIG. 2, an enlarged view of a portion (designated with numeral "2" in FIG. 1) of FIG. 1 is illustrated. The enlarged view of FIG. 2 shows a cross-section of material layers of RHINO thermal protection system 200. Thermal protection system 200 comprises outer layer 210 for protecting the substructure (e.g., front and rear cone portions 102, 104) of vehicle 100. Thermal protection system 200 further comprises inner layer 220 for conforming to the vehicle substructure. Thermal protection system 200 also comprises insulation layer 230 sandwiched between inner and outer layers 210, 220. Insulation layer 230 includes a porous low-density ceramic insulating material having densified portion 232 that covers an inner surface 212 of outer layer 210 to strengthen adhesion and facilitate compatibility with outer layer 210.

In the example embodiment shown in FIGS. 1 and 2, outer layer 210 includes a thin-skin rigid layer of carbon-fiber reinforced silicon carbide (C—SiC) for protecting the vehicle substructure. The thin-skin layer of C—SiC 210 has thickness between about 0.04 inches (0.102 centimeters) and about 0.08 inches (0.203 centimeters). The thin-skin layer of C—SiC 210 has a coefficient of thermal expansion of about 1.65 parts-per-million per degrees Fahrenheit (ppm/° F.). In some embodiments, outer layer 210 comprises a thin-skin layer of ceramic fiber-reinforced non-oxide ceramic matrix composite, such as carbon-silicon carbide, silicon carbide-silicon carbide, carbon-hafnium carbide, silicon-hafnium boride, carbon-silicon nitride, having a thickness between about 0.04 inches (0.102 centimeters) and about 0.08 inches (0.203 centimeters).

An example of inner layer 220 includes a conformal layer of silicone 222 for conforming to the vehicle substructure 108. The layer of conforming silicone 222 is bonded with room temperature vulcanization (RTV) silicone 224 that covers an inner surface 234 of insulation layer 230. The layer of conforming silicone 222 has a thickness of about 0.25 inches (0.635 centimeters). The RTV silicone 224 has a thickness of about 0.01 inches (0.025 centimeters). In some embodiments, inner layer 220 includes a layer of conforming material, such as silicone or strain isolating pad that covers an inner surface of insulation layer 230. In some embodiments, the layer of conforming material is adhesively bonded to insulation layer 230.

Insulation layer 230 has a thickness of about one inch (2.54 centimeters). The porous low-density ceramic material of insulation layer 230 is rigid and has a density between about 12 pounds-per-cubic feet (lbs/ft$^3$) and 25 lbs/ft$^3$. Insulation layer 230 has a coefficient of thermal expansion of about 1.58 ppm/° F. Densified portion 232 has a thickness between about 0.10 inches (0.254 centimeters) and about 0.20 inches (0.508 centimeters).

The combination of outer, inner, and insulation layers 210, 220, 230 cooperate to enable thermal protection system 200 to withstand a temperature up to or above 3000° F. without degradation of thermal protection system 200 while maintaining the vehicle substructure at or below its maximum temperature capability.

Figure 3:
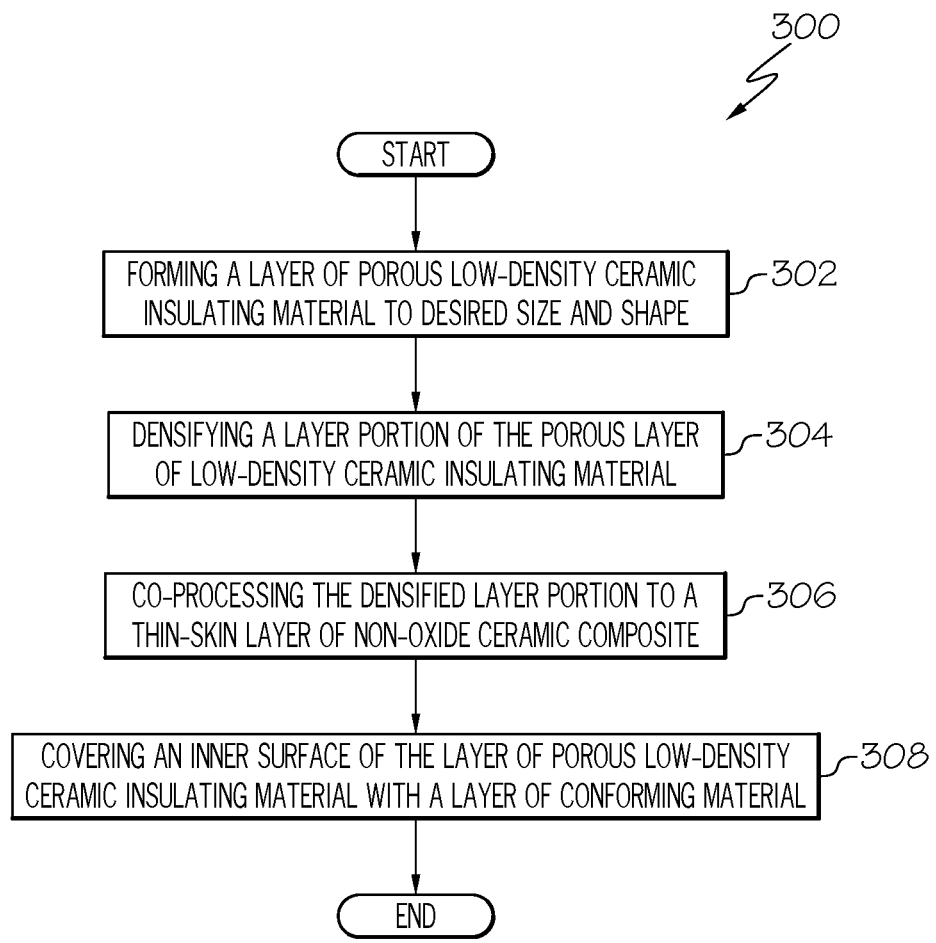
FIG. 3 is a flow diagram depicting an example method of producing a non-oxide ceramic composite for making the RHINO thermal protection system of FIGS. 1 and 2.

The following example illustrates a method of producing a non-oxide ceramic composite for making thermal protection system 200 in accordance with an embodiment. The example method is intended to illustrate, but in no way limits, the scope of the invention Referring to FIG. 3, flow diagram 300 depicts an example method of producing an example non-oxide ceramic composite for making the example RHINO thermal protection system 200 shown in FIGS. 1 and 2. In block 302, a layer of porous low-density ceramic insulating material is formed to (e.g., machined) to a desired size and shape (i.e., a final size and shape). An example porous low-density ceramic insulating material is commercially available as part number HBMS-36-021-01 from The Boeing Company located in Huntington Beach, Calif. Other porous low-density ceramic insulating materials that can be used such as carbon or silicon carbide foam are possible. The process then proceeds to block 304.

In block 304, layer portion 232 of the layer of porous low-density ceramic insulating material is densified to create a multi-layer densified layer portion. In some embodiments, layer portion 232 is densified by ceramic slurry infiltration and post cure, followed by pre-ceramic resin infiltration and pyrolysis to close the porosity and thereby to create the multi-layer densified layer portion. In some embodiments, the porous low-density ceramic insulating material is subjected to repeated pyrolysis and repeated coating with a polymeric resin to remove structural porosity to create densified layer portion 232. In some embodiments, densified layer portion 232 has a density between about 24 lbs/ft$^3$ and 50 lbs/ft$^3$.

Then, in block 306, densified layer portion 232 from block 304 is co-processed to the thin-skin layer of non-oxide ceramic composite, such as C—SiC 210. More specifically, densified layer portion 232 is co-processed to the thin-skin layer of C—SiC 210 by in-situ processing of the thin-skin layer of C—SiC 210 to the densified layer portion 232 and subjecting the thin-skin layer of C—SiC 210 to repeated infiltration with a polymeric resin and repeated pyrolysis to create a fully densified thin-skin layer of C—SiC 210. Also, as shown in block 308, an inner surface of the layer of porous low-density ceramic insulating material is covered with a layer of conforming material 222 that is bonded with RTV silicone 224. The process then ends.

A non-oxide ceramic composite produced in accordance with above-described example method is suitable for making any thermal protection system, such as example thermal protection system 200 shown in FIGS. 1 and 2. In particular, the non-oxide ceramic composite produced can be used to manufacture thermal protection systems for high-speed vehicle applications.

It should be apparent that an integrated hybrid material thermal protection system is provided for a high-speed vehicle, such as a high-speed strike weapon, for example. The thermal protection system can fit over a cold vehicle substructure or a warm vehicle substructure. The layer of conformal material partially isolates the layer of porous low-density ceramic insulating material and the thin non-oxide ceramic composite skin such that the thermal protection system "floats" over the vehicle substructure. Also, the coefficient of thermal expansion of the thin-skin layer of non-oxide ceramic composite such as C—SiC (i.e., about 1.65 ppm/° F. in the above example embodiment) and the coefficient of thermal expansion of the insulation layer (i.e., about 1.58 ppm/° F. in the above example embodiment) are closely matched. This provides a good bond between the insulation layer and the thin-skin layer of C—SiC with low stress at elevated temperatures.

The result is a weight-efficient thermal protection system (as compared to current state of the art thermal protection systems) with a capability to handle temperatures of 3000° F. without degradation of the thermal protection system when the thermal protection floats over the vehicle substructure. Another result is a thermal protection system that is relatively easier to manufacture as compared to thermal protection systems comprising a non-oxide ceramic matrix composite sandwich configuration.

It should also be apparent that the integrated hybrid material thermal protection system eliminates the need for a thick laminate. For example, the thin C—SiC skin is stabilized by the underlying low-density insulating layer and the vehicle substructure. This provides a semi-structural shell that does not require additional stiffening to prevent buckling under aeroheating loads, acoustic loads, or mechanical loads. Moreover, the conformal layer decouples the load paths between the vehicle substructure and the semi-structural shell of the low-density insulating material and the thin C—SiC skin. The result is a semi-structural shell that has not only high-temperature capability and low weight, but also excellent insulating characteristics, good strength, and resistance to damage.

Although the above description describes example non-oxide ceramic composite and example methods for producing a non-oxide ceramic composite for OEMs in accordance with military and space regulations, it is conceivable that the example non-oxide ceramic composite and methods may be implemented in any industry in accordance with the applicable industry standards.

Although various aspects of disclosed embodiments have been shown and described, modifications may occur to those skilled in the art upon reading the specification. The present application includes such modifications and is limited only by the scope of the claims.

What is claimed is:

1. A thermal protection system for a vehicle substructure, the thermal protection system comprising:
    an outer layer for protecting the vehicle substructure;
    an inner layer for conforming to the vehicle substructure, wherein the inner layer comprises a layer of conforming material; and
    an insulation layer sandwiched between the inner and outer layers, wherein the insulation layer includes a porous low-density ceramic insulating material having a densified portion that covers an inner surface of the outer layer to strengthen adhesion, and wherein the densified portion comprises an infiltrant received within pores defined by the porous low-density ceramic insulating material,
    wherein the conforming material of the inner layer is bonded to an inner surface of the insulation layer.

2. The thermal protection system according to claim 1 wherein the densified portion of the porous low-density ceramic insulating material has a thickness between about 0.10 inches (0.254 centimeters) and about 0.20 inches (0.508 centimeters).

3. The thermal protection system according to claim 1 wherein the outer layer comprises a thin-skin layer of ceramic fiber-reinforced non-oxide ceramic matrix composite, such as carbon-silicon carbide, silicon carbide-silicon carbide, carbon-hafnium carbide, carbon-hafnium boride, carbon-silicon nitride, having a thickness between about 0.04 inches (0.102 centimeters) and about 0.08 inches (0.203 centimeters).

4. The thermal protection system according to claim 1 wherein the outer layer has a coefficient of thermal expansion of about 1.65 ppm/° F.

5. The thermal protection system according to claim 4 wherein the insulation layer has a coefficient of thermal expansion of about 1.58 ppm/° F.

6. The thermal protection system according to claim 5 wherein the combination of the outer, inner, and insulation layers cooperate to enable the thermal protection system to withstand a temperature up to or above 3000° F. without degradation of the thermal protection system while maintaining the vehicle substructure at or below its maximum temperature capability.

7. The thermal protection system according to claim 1 wherein the layer of conforming material is adhesively bonded to the insulation layer.

8. A thermal protection system for a vehicle substructure, the thermal protection system comprising:
    an outer rigid layer including a thin-skin layer of non-oxide ceramic composite such as carbon-silicon carbide, silicon carbide-silicon carbide, carbon-hafnium carbide, carbon-hafnium boride, carbon-silicon nitride, having a thickness between about 0.04 inches and about 0.08 inches;
    an inner conformal layer conforming to the vehicle substructure; and
    a rigid ceramic insulation layer sandwiched between the inner and outer layers, wherein the insulation layer includes a porous low-density ceramic material having a density between about 12 lbs/ft$^3$ and 25 lbs/ft$^3$.

9. The thermal protection system according to claim 8 wherein the thin-skin layer of non-oxide ceramic composite includes carbon-fiber reinforced silicon carbide layer having a coefficient of thermal expansion of about 1.65 ppm/° F.

10. The thermal protection system according to claim 9 wherein the rigid ceramic insulation layer has a coefficient of thermal expansion of about 1.58 ppm/° F.

11. The thermal protection system according to claim 10 wherein (i) the porous low-density ceramic insulating material includes a densified portion that covers an inner surface of the carbon-fiber reinforced silicon carbide layer to strengthen adhesion with the carbon-fiber reinforced silicon carbide layer, and (ii) the combination of the outer, inner, and insulation layers cooperate to enable the thermal protection system to withstand a temperature up to or above 3000° F. without degradation of the thermal protection system while maintaining the vehicle substructure at or below its maximum temperature capability.

12. The thermal protection system according to claim 11 wherein the densified portion of the porous low-density ceramic insulating material has a thickness between about 0.10 inches (0.254 centimeters) and about 0.20 inches (0.508 centimeters).

13. The thermal protection system according to claim 12 wherein the inner conformal layer is bonded with room temperature vulcanization (RTV) silicone and covers an inner surface of the insulation layer.

14. The thermal protection system according to claim 8 wherein (i) the porous low-density ceramic insulating material includes a densified portion that covers an inner surface of the carbon-fiber reinforced silicon carbide layer to strengthen adhesion with the carbon-fiber reinforced silicon carbide layer, and (ii) the combination of the outer, inner, and insulation layers cooperate to enable the thermal protection system to withstand a temperature up to or above 3000° F. without degradation of the thermal protection system while maintaining the vehicle substructure at or below its maximum temperature capability.

15. The thermal protection system according to claim 14 wherein the densified portion of the porous low-density ceramic insulating material has a thickness between about 0.10 inches (0.254 centimeters) and about 0.20 inches (0.508 centimeters).

16. The thermal protection system according to claim 15 wherein the carbon-fiber reinforced silicon carbide layer has thickness between about 0.04 inches (0.102 centimeters) and about 0.08 inches (0.203 centimeters).

17. The thermal protection system according to claim 1 wherein the conforming material comprises silicone.

18. The thermal protection system according to claim 1 wherein the conforming material comprises a strain isolating pad.

19. The thermal protection system according to claim 1 wherein the conforming material of the inner layer is bonded to the inner surface of the insulation layer with room temperature vulcanization (RTV) silicone.

20. The thermal protection system according to claim 1 wherein said densified portion comprises a density between about 24 lbs/ft$^3$ and about 50 lbs/ft$^3$.

* * * * *